United States Patent Office 3,597,211
Patented Aug. 3, 1971

3,597,211
PHOTOGRAPHY

James F. Betts, Euclid, and Victor P. Petro, Brecksville, Ohio, assignors to Horizons Incorporated, a Division of Horizons Research Incorporated
No Drawing. Filed Oct. 18, 1968, Ser. No. 768,895
Int. Cl. G03c *1/72*
U.S. Cl. 96—88 5 Claims

ABSTRACT OF THE DISCLOSURE

Photosensitive compositions comprising a mixture of at least one Schiff's base and at least one activator for the Schiff's base in such amounts and such proportions that a visible or developable latent image is produced when the composition is exposed to a pattern of radiation of the proper wavelength. The Schiff's base and activator materials are preferably dissolved in or dispersed in or supported in or on a binder support or carrier which may be a synthetic resin polymer or paper or cloth or other suitable carrier.

The invention herein described was made in the course of or under a contract or subcontract thereunder, with the Systems Engineering Group, Air Force Systems Command.

This invention relates to the use of Schiff's bases as part of a radiation sensitive image forming system. More particularly, it relates to the use of Schiff's bases in conjunction with an activator such that upon exposure to electromagnetic radiation of the proper wavelength, a highly colored compound is ultimately produced from the Schiff's base. The radiation sensitive compositions of the present invention include at least one of each of the following classes of materials:

(1) A Schiff's base;
(2) An activator for the Schiff's base;
(3) A binder support or carrier on which or in which the remaining constituents may be dispersed or supported; and
(4) Other optional ingredients which may be added to the composition for specific purposes provided they do not adversely affect the photosensitive nature of the system.

By using two or more Schiff's bases in the composition, colors may be produced which are not available when using one Schiff's base alone.

(1) THE SCHIFF'S BASES

The Schiff's bases useful in the present invention are those represented by the general formula:

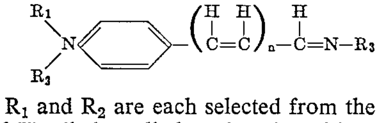

wherein $R_1$ and $R_2$ are each selected from the group consisting of H, alkyl, aralkyl, and aryl, and $R_1$ and $R_2$ may be the same or different; $R_3$ is selected from alkyl, aralkyl, aryl, nitrogen containing heterocyclic or similar groups; and *n* is an integer from 0 to 3.

In the examples which follow, typical compounds coming within the above formula are utilized. Other compounds which have been found useful in the practice of this invention include:

N-(p-dimethylaminobenzilidine)-p-anisidine,
N-(p-dimethylaminobenzilidine)-p-phenetidine,
N-(p-dimethylaminobenzyl)-p-hexoxyaniline,
p-Diethylaminobenzaldehyde anil, and
N-(p-dimethylaminobenzilidine)-p-N,N-dimethylaminoaniline.

(2) THE ACTIVATORS

One activator which is particularly preferred is iodoform ($CHI_3$), but other compounds in which at least three halogen atoms are attached to a single carbon atom, for example the halogenated compounds described in U.S. Pat. 3,095,303, the disclosure of which is incorporated by reference, are useful as activators for the Schiff's base or bases.

Other particularly preferred activators, in addition to iodoform, are carbon tetrabromide and carbon tetraiodide.

(3) THE CARRIER

In the compositions of this invention, the Schiff's bases and the activator are combined in a solution of a polymeric material suitable for coating, as described in U.S. Pat. 3,121,632. The solvent and polymer are chosen for proper solvent characteristics for the base and activator. Solvents and polymers described in U.S. Pat. 3,121,632 are suitable in the present invention, polystyrene and polycarbonates being particularly preferred polymers. The mixture of Schiff's base, activator and any other ingredients included in the composition are dissolved, as described in an article published in 1961, in volume 5, No. 2, pp. 98 et seq. in the Journal of the Society of Photographic Scientists and Engineers and coated on a film base as described in said article.

(4) PROPORTIONS

In the photosensitive compositions of this invention, the Schiff's bases may be used in any proportions up to their solubility limits in the polymer-solvent system which is used for applying the composition to the film base.

For most films approximately 15 to 20 mg. of anil or Schiff's base produces very satisfactory results, but amounts between 2 and 100 mg. of these per each 4 cc. of polymer solution may be used.

The organic halogen compound which serves as the activator in the photosensitive compositions of this invention is preferably present in amounts of between 10 and 400 mg./cc. of polymer solution, the amount being dependent in part on which activator is used.

The concentration of polymer in the polymer-solvent solution which carries the active ingredients to the surface on which the composition is deposited is preferably between 2 and 20% in compositions of the type exemplified in the examples which follow.

(5) OPTICAL DEVELOPMENT

When a composition comprised of the above indicated constituents is exposed to actinic radiation, an image, either latent or visible, is produced. The image may then be developed or intensified by exposure to radiant energy in a wavelength region absorbed by the image and one to which the original composition is insensitive.

(6) FIXING

Where the activator is suitably chosen, and the Schiff's base itself is not sensitive to the wavelength to which the system must be exposed, and where the Schiff's base is suitably heat stable, the system may be heat fixed by holding for short periods of time at relatively high temperatures.

The following examples will serve to further illustrate the practice of this invention.

Example 1

A solution was prepared in the dark or under a photographic safelight by adding 5 mg. of p-dimethylaminocinnamaldehyde anil, 12 mg. of triphenylstibine, 63 mg. of 2,6-di-tert-butyl-p-cresol, and 250 mg. of iodoform in turn to 5 cc. of 20% w./v. polycarbonate resin in methylene chloride, stirring after each addition to insure that it has dissolved before the next ingredient was added. The resulting composition was applied to a film base of polyethylene terephthalate (Mylar) as a coating of 0.0015" wet coating thickness and then air dried, in the dark, prior to exposure. The dried film was exposed through a step wedge to 1.0 watt sec./cm.$^2$ on a pulsating xenon light source. The exposed film was then heat fixed by holding at 140° C. in a circulated air oven for 4 minutes. The resulting image has 9 steps above background. The image was magenta (peak at 545 nm.).

Example 2

The film of Example 1 was prepared and exposed in the same way as in Example 1. It was then optically developed by exposure through a Corning No. 2408 filter for 1 minute. Eleven steps above background were visible along with an increase in maximum density. This illustrates optical development to intensify or further develop the image.

Example 3

In the composition of Example 1, 12 mg. of N'-p-anisylidene-N,N-dimethyl-p-phenylenediamine was substituted for the anil. The composition was prepared and coated as in Example 1. A 5.0 watt-sec/cm.$^2$ exposure results in 11 steps above background. The image was orange (peak at 490 nm.).

Example 4

The procedure of Example 1 was followed, except that 12 mg. of N'-p-anisylidine-N,N-dimethyl-p-phenylenediamine was added to the 5 mg. of p-dimethylaminocinnimaldehyde anil used as color former. The remainder of the composition was as in Example 1. An exposure of 5.0 watt-sec/cm.$^2$ followed by the heat fixing described in Example 1 results in a permanent red orange image which peaks at 510–530 nm.

Example 5

The procedure of Example 1 was followed, except that 3 mg. of p-dimethylaminobenzaldehyde anil was substituted for the cinnimaldehyde anil of Example 1. An exposure of 5.0 watt-sec/cm.$^2$ results in an image 5 steps above background which peaks at 450 nm.

Example 6

The procedure of Example 1 was repeated, except that 3 mg. of 4-dimethylaminobenzaldehyde-4'-dimethylamino anil was substituted for the anil of Example 1. A 5.0 watt-sec./cm.$^2$ exposure gives 11 steps of image peaking at 455 nm.

Example 7

Again the procedure of Example 1 was followed, except that 5 mg. of 4-(p-dimethylaminobenzilidine)-4-aminoquinaldine was substituted for the anil of Example 1. A 1.0 watt-sec./cm.$^2$ exposure results in 10 steps above background with a peak absorption at 480 nm.

Example 8

A composition was prepared by mixing the following in the dark: 15 mg. of 4-dimethylaminobenzaldehyde-4'-dimethylamino anil, 250 mg. of iodoform, 3 cc. of 20% polystyrene solution in benzene and 1 cc. of toluene. The resulting composition was coated on a film base as in Example 1. After drying, it was exposed through a step wedge to 1.0 watt-sec./cm.$^2$, as in Example 1. It was then heat fixed for 5 minutes at 140° C. Thirteen steps of orange image with a peak at 470 to 490 result.

Example 9

15 mg. of 4'-dimethylaminobenzaldehyde-4'-dimethylamino anil, 15 mg. of 4-(p-dimethylaminostyryl) quinoline, 250 mg. of idoform, 3 cc. of 20% polystyrene solution in benzene and 1 cc. of toluene are mixed, coated, dried and exposed, as in Example 8. Seventeen steps of brown image with a broad peak at 500–520 nm. results.

Example 10

Under a photographic safetlight, or in the dark, 250 mg. of 1,1-bis-(p-dimethylaminophenyl)-ethylene, 6 mg. of p-dimethylaminobenzaldehyde anil, 12 mg. of N-p-anisylidine-phenylenediamine, 12 mg. of triphenylstibine, 63 mg. of 2,6-di-tert-butyl-p-cresol, and 250 mg. of iodoform were mixed with 5 cc. of 20% by weight solution of Lexan polycarbonate resin dissolved in methylene chloride and coated as in the preceding examples. An 0.4 watt-sec. exposure on the pulsating xenon source followed by 1½ minute optical development and 1½ minute heat fixing at 135° C. results in a dark green image. Omission of the Schiff's bases gives a blue green image.

We claim:

1. A photosensitive composition adapted to be dispersed, dissolved or supported on or in a binder, carrier or other support, said composition comprising:

(1) a Schiff's base represented by the general formula

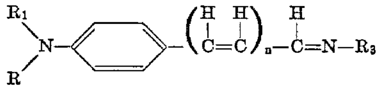

wherein $R_1$ and $R_2$ are each selected from the group consisting of H, alkyl, aralkyl, and aryl, and $R_1$ and $R_2$ may be the same or different, $R_3$ is selected from alkyl, aralkyl, aryl, nitrogen containing heterocyclic or similar groups, and $n$ is an integer from 0 to 3; and (2) an activator for said Schiff's base which reacts with the same when the composition is exposed to a suitable dose of radiation, said activator being an organic halogen compound in which at least three halogen atoms are connected to a single carbon atom.

2. The composition of claim 1 wherein the Schiff's base is selected from the group consisting of: p-dimethylaminocinnamaldehyde anil; N'-p-anisylidene-N,N-dimethyl-p-phenylenediamine; p-dimethylaminobenzaldehyde anil; 4-dimethylaminobenzaldehyde-4'-dimethylamino anil; 4-(p-dimethylaminobenzilidene)-4-aminoquinaldine, and mixtures thereof.

3. The composition of claim 1 wherein the activator is iodoform.

4. A photosensitive article comprising a composition according to claim 1, supported as a thin film, in a binder on a support.

5. A method producing a visible image which comprises exposing a thin layer of a composition according to claim 1 to a pattern of radiation and intensifying the image produced in said composition by said exposure by exposing the entire layer to radiant energy in a wavelength region absorbed by the image and which is one to which the original composition is insensitive.

References Cited

UNITED STATES PATENTS

| | | | |
|---|---|---|---|
| 3,095,303 | 6/1963 | Sprague et al. | 96—33 |
| 3,121,632 | 2/1964 | Sprague et al. | 96—90X |
| 3,483,162 | 12/1969 | Kovacic | 96—90X |

OTHER REFERENCES

Sprague et al.: Photographic Science & Engineering, vol. 5, No. 2, March-April 1961, pp. 98–103, "New Photographic Processes."

Luzzi: IBM Tech. Disclosure Bulletin, "Photosensitizer," vol. 9, No. 5, October 1966, p. 448.

WILLIAM D. MARTIN, Primary Examiner

H. J. GWINNELL, Assistant Examiner

U.S. Cl. X.R.

96—90